US010378445B2

(12) United States Patent
Edwards et al.

(10) Patent No.: US 10,378,445 B2
(45) Date of Patent: Aug. 13, 2019

(54) GAS TURBINE ENGINE FUEL SYSTEM

(71) Applicant: ROLLS-ROYCE PLC, London (GB)

(72) Inventors: Huw Llewelyn Edwards, Derby (GB); Stephen Mark Husband, Derby (GB); John James Anthony Cullen, Derby (GB)

(73) Assignee: ROLLS-ROYCE plc, London (GB)

( * ) Notice: Subject to any disclaimer, the term of this patent is extended or adjusted under 35 U.S.C. 154(b) by 606 days.

(21) Appl. No.: 14/694,403

(22) Filed: Apr. 23, 2015

(65) Prior Publication Data

US 2015/0315980 A1    Nov. 5, 2015

(30) Foreign Application Priority Data

May 2, 2014    (GB) .................................. 1407743.2

(51) Int. Cl.
*F02C 7/22* (2006.01)
*F02C 6/00* (2006.01)
(Continued)

(52) U.S. Cl.
CPC .................. *F02C 7/22* (2013.01); *F02C 6/00* (2013.01); *F02C 9/30* (2013.01); *F04C 15/008* (2013.01);
(Continued)

(58) Field of Classification Search
CPC ...... F02C 7/22; F02C 7/32; F02C 9/30; F04C 15/008; F04C 2/08; F04C 2210/1044;
(Continued)

(56) References Cited

U.S. PATENT DOCUMENTS 5,152,141 A    10/1992    Rumford et al.
7,262,539 B2 *    8/2007    Dooley ................ H02K 21/046
310/113
(Continued)

FOREIGN PATENT DOCUMENTS

CN    101026326 A    8/2007
CN    102545501 A    7/2012
(Continued)

OTHER PUBLICATIONS

Nov. 4, 2014 Search Report issued in British Application No. GB1407743.2.
(Continued)

*Primary Examiner* — Phutthiwat Wongwian
*Assistant Examiner* — Loren C Edwards
(74) *Attorney, Agent, or Firm* — Oliff PLC (57) ABSTRACT

The present application discloses a fuel system for a gas turbine engine. The engine includes a main alternating current electrical generator driven by an engine shaft such that the electrical output frequency of the electrical generator varies in dependence on shaft rotational speed. The fuel system includes a variable flow fuel pump for providing a fuel flow to the engine, a frequency and/or voltage controller configured to provide electrical power having at least one of a predetermined output frequency and a predetermined voltage, and a variable speed electric motor configured to drive the fuel pump. The electric motor includes an induction motor having a stator and at least a first rotor, the stator having first and second sets of stator windings. Each set of stator windings is configured to impart a torque on the rotor in use.

13 Claims, 5 Drawing Sheets

(51) Int. Cl.
  *F04C 15/00* (2006.01)
  *H02K 17/12* (2006.01)
  *H02K 3/46* (2006.01)
  *H02K 16/02* (2006.01)
  *F02C 9/30* (2006.01)
  *H02K 16/00* (2006.01)
  *F04C 2/08* (2006.01)
  *H02K 3/28* (2006.01)

(52) U.S. Cl.
  CPC ............... *H02K 3/46* (2013.01); *H02K 16/00* (2013.01); *H02K 16/02* (2013.01); *H02K 17/12* (2013.01); *F04C 2/08* (2013.01); *F04C 2210/1044* (2013.01); *F04C 2240/403* (2013.01); *F04C 2270/095* (2013.01); *F04C 2270/105* (2013.01); *F05D 2220/32* (2013.01); *F05D 2220/76* (2013.01); *F05D 2220/764* (2013.01); *F05D 2260/60* (2013.01); *F05D 2270/03* (2013.01); *F05D 2270/061* (2013.01); *F05D 2270/07* (2013.01); *H02K 3/28* (2013.01); *H02K 2213/06* (2013.01); *H02K 2213/09* (2013.01); *H02K 2213/12* (2013.01)

(58) Field of Classification Search
  CPC .......... F04C 2240/403; F04C 2270/095; F04C 2270/105; H02K 3/28; H02K 3/46; H02K 16/00; H02K 16/02; H02K 17/12; H02K 2213/06; H02K 2213/09; H02K 2213/12; F05D 2220/32; F05D 2220/76; F05D 2220/764; F05D 2260/60; F05D 2270/03; F05D 2270/061; F05D 2270/07; H02P 9/00; H02P 9/04; H02P 9/48
  USPC .......................................................... 60/772
  See application file for complete search history.

(56) References Cited

U.S. PATENT DOCUMENTS

| | | |
|---|---|---|
| 2004/0011018 A1 | 1/2004 | Bouiller et al. |
| 2004/0050065 A1 | 3/2004 | Voinov |
| 2004/0090204 A1 | 5/2004 | McGinley |
| 2005/0241318 A1 | 11/2005 | Buehman et al. |
| 2007/0267540 A1* | 11/2007 | Atkey .................... B64D 13/06 244/58 |
| 2009/0295551 A1* | 12/2009 | Dickey .................... H02J 3/00 340/568.2 |
| 2010/0015959 A1 | 1/2010 | Yu |
| 2010/0141028 A1 | 6/2010 | Rozman et al. |
| 2011/0023444 A1 | 2/2011 | Veilleux, Jr. |
| 2014/0291987 A1* | 10/2014 | Dooley .................... F02C 7/275 290/34 |

FOREIGN PATENT DOCUMENTS

| | | |
|---|---|---|
| EP | 2 088 302 A2 | 8/2009 |
| GB | 2488129 A | 8/2012 |
| JP | 2008248875 A | 10/2008 |

OTHER PUBLICATIONS

Aug. 31, 2015 Search Report issued in European Patent Application No. 15 16 4822.

* cited by examiner

GAS TURBINE ENGINE FUEL SYSTEM

FIELD OF THE INVENTION

The present invention relates to a fuel system for a gas turbine engine, and a gas turbine engine comprising a fuel system.

BACKGROUND TO THE INVENTION

Figure 1:
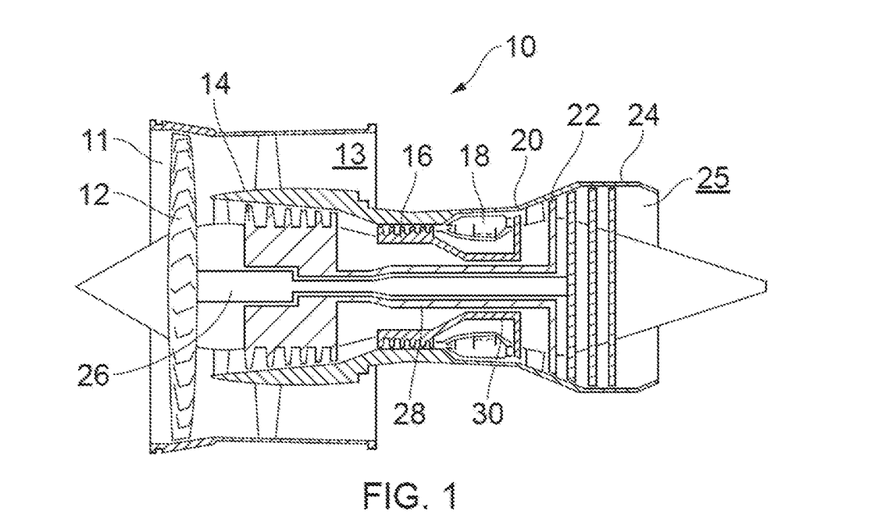
FIG. 1 shows a schematic view of a gas turbine engine.

FIG. 1 shows a high-bypass gas turbine engine 10. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

Fuel is provided to the combustor for combustion with the air by a fuel system. A typical prior fuel system includes a main fuel line, a fuel pump (which may be mechanically driven by a shaft or may be driven by an electric motor), and a fuel metering unit (FMU). Fuel is pumped from a fuel tank by the pump through the main fuel line to the fuel metering unit. A portion of the fuel received by the FMU is delivered to a fuel injector located downstream of the FMU within the combustor to provide a metered flow rate of fuel to the engine. The remainder of the fuel is recirculated back to the input of the fuel pump. By varying the proportion of fuel delivered to the combustor compared to the recirculated fuel, the rate of flow of fuel delivered to the combustor can be varied in dependence on the fuel demand, which is determined by an engine control unit (ECU or FADEC).

Induction motors have advantages for use in such applications, in view of their relatively high reliability and low cost. Induction motors comprise a stator having at least one electrical winding, and a rotor. In operation, a magnetic field is induced in the rotor by the magnetic field produced by the stator. This rotor magnetic field interacts with the magnetic field created by the stator winding. The stator electrical winding is supplied with AC electrical power, which creates a rotating magnetic field. The rotating magnetic field produced by the stator windings interacts with the magnetic field produced by the rotor to produce mechanical torque, thereby rotating the rotor.

The speed of AC induction motors can be altered either by altering the frequency of the AC current in the stator, or by changing the voltage of the AC power, or often a combination of the two (known in the art as "V/f control"). AC generators used in modern aircraft engines generally produce an AC current having a frequency which varies in dependence on engine speed, typically varying between 360 and 800 Hz. Consequently, where the fuel pump is driven by an induction motor, the rotational speed of the fuel pump will also change in accordance with engine speed. However, in some cases (such as for acceleration or deceleration of the engine) it is necessary to operate the pump at a speed which does not correlate to the current speed of the engine, to better match supply and demand. Consequently, either power electronics must be used to convert the AC current provided by the engine generators to the required frequency, or the motor speed must be controlled by adjusting the input voltage.

Both of these methods have disadvantages. Power electronics units are relatively bulky and heavy, and may require cooling systems, particularly in view of the large electrical current required to provide the needed torque. Voltage regulation is relatively inefficient, and has a limited range of output speeds for a given electrical AC input frequency.

The present invention describes a fuel system and a gas turbine engine which seeks to overcome some or all of the above problems.

SUMMARY OF THE INVENTION

According to a first aspect of the present invention, there is provided a fuel system for a gas turbine engine, the gas turbine engine comprising a combustor having a fuel injector, the gas turbine engine comprising a main alternating current electrical generator driven by an engine shaft such that the electrical output frequency of the electrical generator varies in dependence on engine rotational speed, the fuel system comprising:

a variable flow fuel pump configured to provide a fuel flow to the fuel injector;

a frequency and/or voltage controller configured to provide electrical power having at least one of a predetermined output frequency and a predetermined voltage; and a variable speed electric motor configured to drive the fuel pump;

the electric motor comprising an induction motor having a stator and at least a first rotor, the stator having first and second sets of stator windings, each set of stator windings being configured to impart a torque on the rotor in use, the first set of stator windings being supplied with electrical power having the output frequency and voltage supplied by the main generator, the second set of stator windings being supplied with electrical power from the frequency and/or voltage controller.

The second set of stators can apply a torque to the fuel pump, thereby increasing or reducing the torque imparted by the electric motors as a whole to the fuel pump. It has been determined by the inventors that the torque provided by the pump needs only be adjusted by a relatively small amount to account for engine accelerations or decelerations, and so the power rating of the frequency and/or voltage controller for the second set of stators can be relatively low. Consequently, the invention provides a means of controlling fuel flow to the engine, whilst minimising the power rating of the controller (and therefore the size, volume and cooling requirements of the controller). This includes the option of giving sufficient control to remove the need for mechanical fuel metering after the pump, advantageously removing the need to recirculate excess fuel—reducing energy usage, heat to fuel and peak pump rating (and therefore weight and unit cost).

One or each set of stator windings may be polyphase, and may comprise three electrical phases.

Each set of electrical stator windings may comprise a plurality of stator windings.

Each of the sets of electrical stator windings may be arranged around a circumference of the stator. The first and second sets of stator windings may be arranged alternately around the circumference of the stator, such that each stator winding of the first set may be located between a pair of stator windings of the second set.

The fuel system may comprise a stator controller configured to selectively activate one or more electrical stator windings. Advantageously, the or each of the first sets of stator windings can be turned on or off as desired, thereby providing control of the motor speed for a given load, as explained in further detail below.

Alternatively or in addition, the electric motor may comprise a second rotor mechanically coupled to the first rotor, wherein the first rotor is associated with the first set of stator windings, and the second rotor is associated with the second set of stator windings. The first and second rotors may be mounted to a common shaft and may be arranged such that the first and second rotors are arranged co-axially. Advantageously, this concept provides intrinsic fault tolerance given the magnetic circuits are naturally separated.

The main generator may comprise a generator control unit configured to control the voltage of power generated by the main AC generator. Consequently, a further form of speed control can be provided, which may provide further flexibility, and may provide redundancy.

The frequency and/or voltage controller may be powered by an AC electrical bus. The AC electrical bus may be supplied with power by the main AC electrical generator. First and second main AC electrical generators may be provided, which may be driven by first and second shafts respectively of the gas turbine engine. Optionally, the AC electrical bus may also be powered by a third AC electrical generator driven by a third shaft of the gas turbine engine. One of the first, second and third main AC electrical generators may be arranged to only provide electrical power to engine loads such as the electric motor configured to drive the fuel pump.

According to a second aspect of the present invention, there is provided a gas turbine engine comprising a fuel system in accordance with the first aspect of the invention.

According to a third aspect of the present invention, there is provided a method of controlling a fuel system in accordance with the first aspect of the invention, the method comprising:
controlling the frequency and/or voltage of the electrical power in the second set of stator windings to adjust the rotational speed of the rotor to thereby operate the fuel pump to match a fuel demand of the engine.

DETAILED DESCRIPTION

FIG. 1 shows a high-bypass gas turbine engine 10. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

Fuel is provided to the combustor 18 by a fuel system, embodiments of which are described below.

Figure 2:
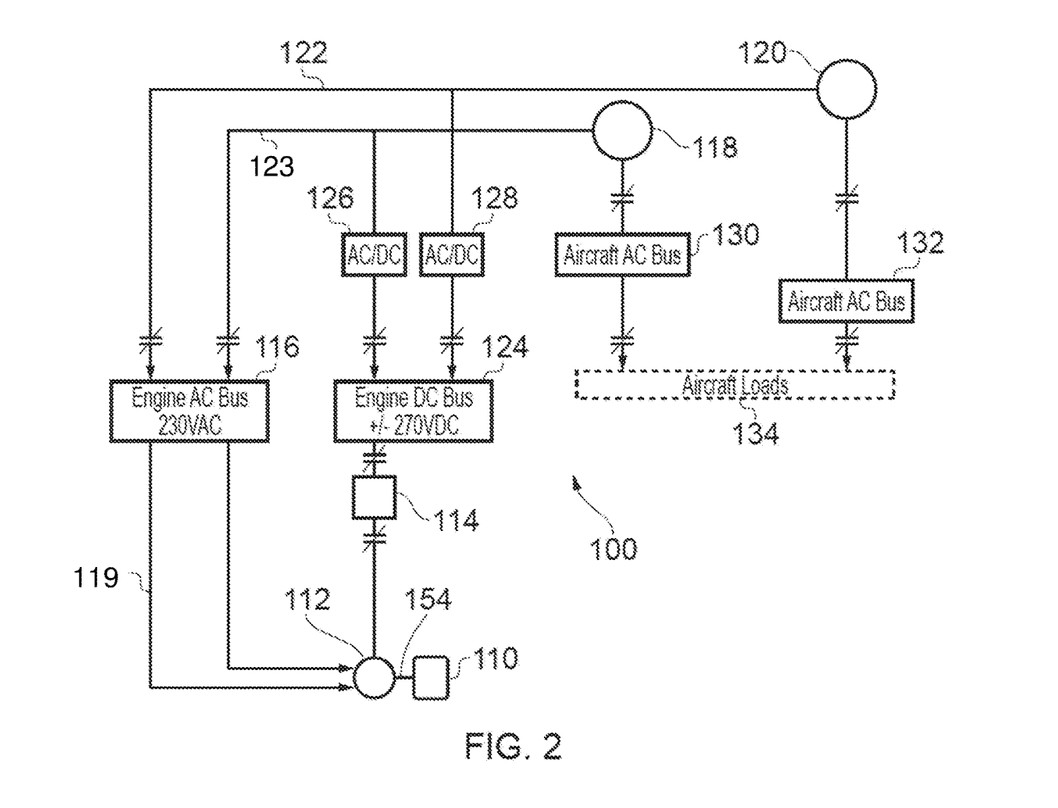
FIG. 2 shows an electrical diagram of a fuel system in accordance with the present disclosure.

FIG. 2 illustrates an electrical network of a fuel system 100 in accordance with a first embodiment of the present disclosure.

The fuel system 100 comprises a variable flow rate fuel pump 110. The pump 110 could be of any type capable of varying its flow rate in accordance with its input speed, such as a constant displacement gear pump, or further mechanical control could be added such as a variable displacement pump, enabling some flow control beyond just input speed. Typically, the fuel pump is capable of operating at speeds of between 5,000 revolutions per minute (RPM) and 8,000 RPM. Typically, the pump 110 would comprise a recirculation loop, where the output of the fuel pump is sent to a mechanical fuel metering unit, which essentially varies an impingement of the flow cross sectional area to reduce the flow rate through the pump 110, and thereby vary the flow rate to the combustor 18.

The first pump 110 is configured to provide fuel flow to combustor 18, and is driven by an electrical induction motor such as motor 112 (described in detail in FIG. 4) or motor 212 (described in detail in FIG. 5), either directly or via a reduction gearbox.

AC electrical power for the AC motor 112, 212 is provided from two sources. The first source provides approximately 90% of the electrical power for the motor 112, and comprises AC electrical power from an engine AC bus 116 via an interconnector 119. AC electrical power for the engine AC bus 116 is in turn supplied by first and second AC electrical generators 118, 120 via respective AC interconnectors 122, 123. The first and second electrical generators 118, 120 are both driven by the same one of the main compressor shafts 26, 28, 30 of the engine 10. The generators 118, 120 could comprise any type of generator which produce electrical power having a frequency and/or voltage which varies in dependence on rotational frequency of the rotor. For example, the generators 118, 120 could comprise switched reluctance generators, reluctance generators, permanent magnet generators, induction generators, doubly fed machines, fault tolerant machines, axial or radial flux machines. In this example it comprises brushless wound field generators (with embedded exciter systems and associated generator control units). Consequently, the frequency of electrical power from the generators 118, 120 varies in relation to the shaft speeds of the respective drive shaft 26, 28, as the engine 10 accelerates and decelerates in use. In this example, the AC generators 118, 120 typically operate at a frequency of between 360 and 800 Hz, and provide electrical power at approximately 230 Volts AC. Generally, only one generator 118, 120 is used at any given time by the engine loads, with the other generator 118, 120 providing a backup (though both are continually used by aircraft loads 134 through aircraft AC bus 130 and AC bus 132).

Some of the power generated by the generators 118, 120 is diverted to an engine DC bus 124 via interconnectors 120, 122 and rectifiers 126, 128. The rectifiers 126, 128 could comprise diodes, or alternatively could comprise active front end AC/DC converters, which may reduce harmonics in the electrical network. In this example, the engine DC bus provides DC electrical power at approximately +/−270 Volts DC. The DC engine bus 124 provides a second source of power to the motor 112 via a frequency/voltage controller 114, which has a fault tolerant topology. It will be understood that in some embodiments, the controller 114 may only be a frequency controller, or may only be a voltage controller, or may be both. Where the controller 114 is both a frequency and voltage controller, the frequency/voltage controller 114 is configured to convert DC electrical power from the DC engine bus 124 to AC electrical power having a required frequency and voltage for the AC motor 112. Such a unit is often referred to as a "motor drive". The controller 114 could include a "soft start" system, which provides gradual acceleration of the motor 112.

Figure 3:
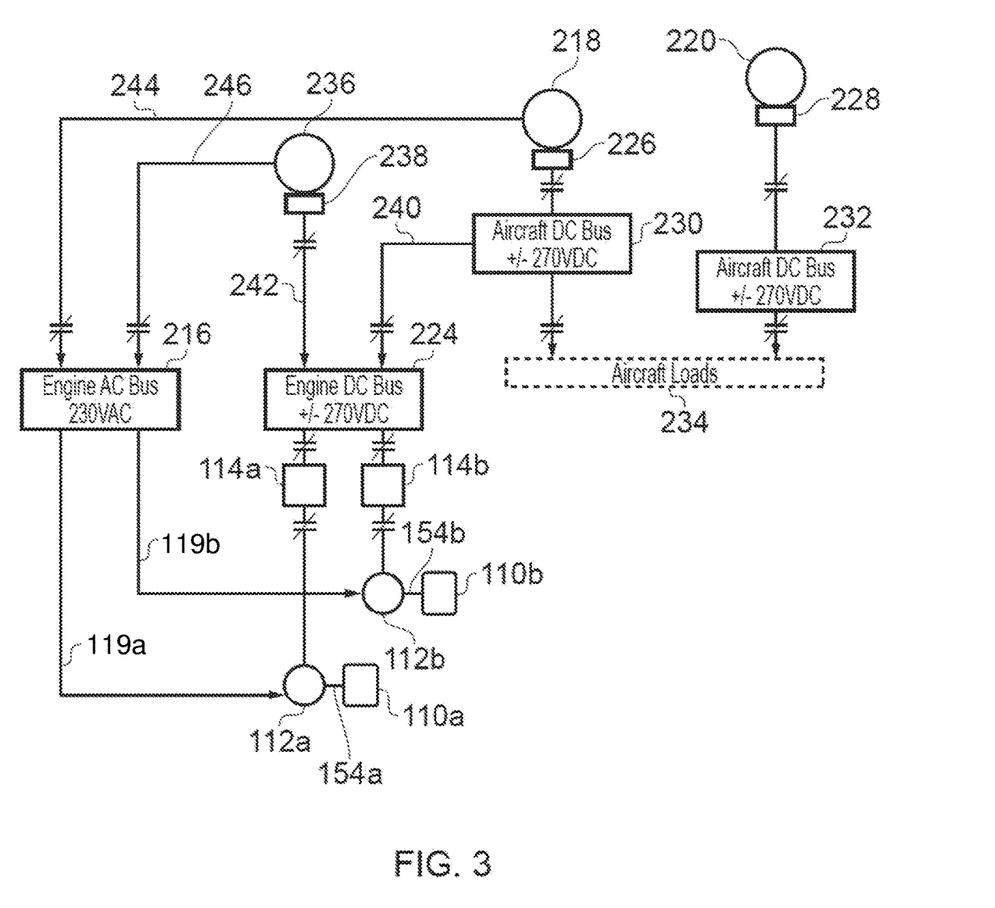
FIG. 3 is an electrical diagram of an alternative fuel system in accordance with the present disclosure.

FIG. 3 shows an alternative electrical network for the fuel system 100. The network of FIG. 3 differs in several respects from that of FIG. 2. Each of these differences is essentially optional, and can be individually included or omitted as necessary.

The network comprises first, second and third main AC electrical generators 218, 220, 236, each being driven by one of the engine shafts 26, 28, 30. Each electrical generator 218, 220, 236 is electrically coupled to a corresponding rectifier 226, 228, 238 which converts the AC electrical power generated by the respective generator to DC electrical power at approximately +/−270 Volts DC. The DC power from the rectifiers 226, 228 of the first and second generators 218, 220 is provided to respective first and second aircraft DC buses 230, 232, which in turn provide DC power to aircraft electrical loads 234 such as avionics, environmental control systems, and electrically powered actuators.

Power from the first aircraft DC bus 230 is also provided to an engine DC bus 224 via a DC interconnector 240. DC power is also provided to the engine DC bus 224 from the third AC engine generator 236 via rectifier 238 and a further DC interconnector 242.

An engine AC bus 216 is provided, which receives AC electrical power from the third generator 236, with the first generator 218 as a backup, via respective AC interconnectors 244, 246. The engine AC electrical bus 216 provides AC electrical power at approximately 230 Volts AC (rms phase to neutral) at the same frequency as that generated by the generators 226, 236, which in turn varies in accordance with engine rotational speed.

AC electrical power from the engine AC bus 216 is provided to first and second electrical motors 112a, 112b at the engine AC bus frequency and voltage via respective AC interconnectors 119a, 119b to thereby provide a first source of AC electrical power to the motors 112a, 112b. The first and second electrical motors 112a, 112b each drive respective fuel pumps 110a, 110b via respective shafts 154a, 154b. The fuel pumps 110a, 110b in turn provide fuel at a required flow rate to main and pilot injectors of a staged combustor as determined by a FADEC 182 (see FIG. 4). Consequently, the system can provide independent fuel flows for a staged combustor.

First and second frequency/voltage controllers 114a, 114b are provided which provide a second source of AC electrical power having a required frequency and/or voltage for the respective AC motors 112a, 112b.

The provision of a third generator dedicated to providing power to the engine AC and DC buses 216, 224 reduces the load on the first and second generators 218, 220. Having a third generator could be beneficial from a certification point of view, since a fault on the aircraft electrical network can't effect engine systems. This third generator may also be fault tolerant (e.g. double 3 phase with concentrated windings).

Figure 4:
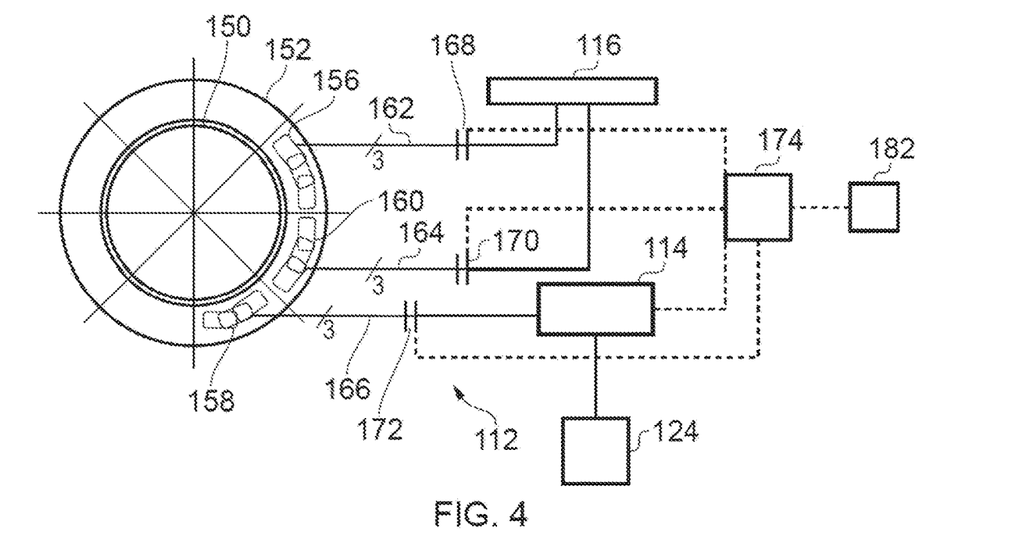
FIG. 4 is a schematic view of a first electric motor for use with the fuel system of either FIG. 2 or 3.

FIG. 4 shows part of a first embodiment of the motor 112. The motor 112 comprises a rotor 150 and a stator 152. The rotor 150 is coupled to a motor shaft 154 to drive the fuel pump 110. The rotor 150 comprises one of a squirrel cage, shorted wound field windings or a solid iron rotor and is driven by a rotating magnetic field generated by the stator 152.

The stator 152 comprises a plurality of sets of stator windings, each set of stator windings comprising separate sets of multi-phase windings, some of which are shown. In this embodiment, first, second and third sets of three phase stator windings 156, 158, 160 are provided, which are powered via respective power cables 162, 164, 166.

These windings would also be connected to opposite segments of the same set to reduce torque imbalances, thus reducing bearing wear. Optional switches 168, 170, 172 are provided for each respective power cable 162, 164, 166, and are configured to selectively connect or disconnect the respective stator windings 156, 158, 160 from their respective power sources. The switches 168, 170, 172 are controlled by a motor controller 174, which is configured to connect or disconnect the stator windings 156, 158, 160 from their respective power sources. The motor controller 174 is also connected to the frequency/voltage controller 114 to control the output frequency/voltage provided by the frequency/voltage controller 114. The motor controller 174 could comprise part of the frequency/voltage controller 114, or could comprise a separate controller, or part of an existing controller, such as an engine fuel control such as a FADEC 182, which is normally provided as part of the engine 10.

The first and third sets of stator windings 156, 160 are provided with AC power directly from the engine AC bus 116 at the same frequency and voltage as the electrical power generated by the generators 118, 120, which in turn is dependent on rotational speed of the respective drive shafts 25, 28. The second set of stator windings 158 is powered by AC power provided by the frequency/voltage controller 114. When operational, magnetic fields induced by each of the stator windings interact with the magnetic fields induced in the rotor to produce a torque on the rotor 150.

During normal operation of the motor 112, the majority of electrical power (around 90%) supplied to the motor 112 comes from the engine AC electrical bus 116. However, the total amount of torque produced by the motor 112 can be adjusted by adjusting the frequency and/or voltage applied to the third set of stator windings 160 by the frequency/voltage controller 114, as explained below with reference to FIGS. 7 and 8.

Figure 7:
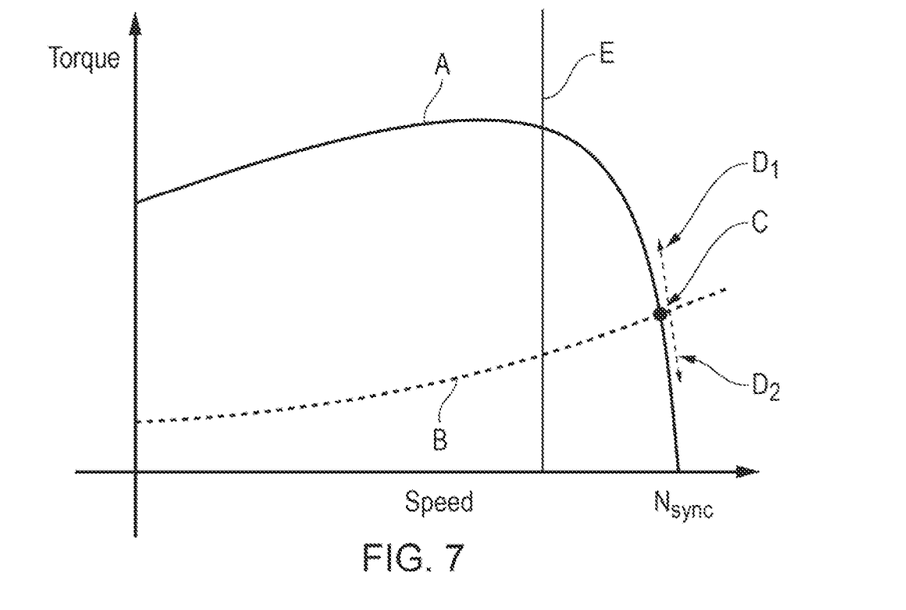
FIG. 7 is a graph showing the torque/speed curves for the electric motor of FIG. 4 when different frequency electrical currents are applied to the stators.

FIG. 7 shows how adjusting the frequency applied to the second set of stators 158 by the controller 114 can be used to adjust the torque applied by the motor 112. Solid line A shows the torque applied to the rotor 150 by the first and third sets of stator windings 156, 160 (i.e. the stator windings driven by the engine AC bus 116) as a function of rotational speed of the rotor 150 for a given voltage. The shape of this curve is typical of induction machines, though variations are possible with for example reduced starting torques. Broken line B shows the torque imposed on the rotor 150 by the mechanical load (i.e. the fuel pump 110) and the stator winding 158 (i.e. the winding driven by the frequency controller 114) as a function of speed. The torque imposed on the rotor 150 by the stator windings 158 can be regarded as a load, since this acts independently of the torque produced by the windings 156, 160, although in many cases this load will be negative (i.e. the second set of stator windings 158 will interact with the rotor 150 to act as a motor).

As the speed of the rotor 150 increases from a stationary condition, the torque generated by the stator windings 156, 160 on the rotor 150 increases, as shown by rising line A. At a certain point, the torque generated by the stator windings 156, 160 starts to decrease again. Constant speed line E represents the "stability line" for this condition. Speeds lower than the stability region comprise a "startup region" in which the rotor 150 will produce more torque as it accelerates, and higher speeds comprising a "stability region" in which torque falls as speed increases. When the rotor speed reaches a speed at which the torque imposed on the rotor 150 by the first and third stators 156, 160 matches the load on the rotor 150 imposed by the fuel pump 110 and the second stator winding 158, the rotor 150 stops accelerating. This point is represented on the graph in FIG. 7 as the point C where lines A and B cross, and is known as the "operating point".

Where it is desirable to increase or decrease the rotational speed of the rotor 150, and so increase or decrease the pumping speed of the fuel pump 110 (to accommodate required engine accelerations or decelerations respectively for example, as commanded by the FADEC 182), the load imposed on the rotor 150 by the second set of stator windings 158 can be adjusted by adjusting the frequency of the electrical current applied to the second set of stator windings 158 by the frequency controller 114. In this situation, a signal is sent from the motor controller 174 to the frequency controller 114 to adjust the frequency of the electrical power produced by the controller 114.

For example, where the electrical frequency of the power applied by the stator windings 158 is lower than the rotational frequency of the rotor 150, a braking force will be applied by the stator 160 to the rotor 150, and the rotor 150 will be decelerated. Essentially, by applying electrical power to the second set of stator windings 158 at a lower electrical frequency than the rotor rotational frequency, additional load is applied to the rotor 150, thereby moving the load curve in the direction shown by arrow $D_1$ in FIG. 7. This has the effect of moving the operating to a lower speed, and so the rotor decelerates.

On the other hand, if the electrical frequency of the power applied by the stator windings 158 is higher than the rotational frequency of the rotor 150, an accelerating force will be applied by the stator 152 to the rotor 150, and the rotor 150 will be accelerated. Essentially, by applying electrical power to the stator windings 158 at a higher frequency than the rotor rotational frequency, additional torque is applied to the rotor 150 in the same direction as that applied by the first and third stators 156, 160. In other words the load imposed on the rotor 150 is reduced, thereby moving the load curve in the direction shown by arrow $D_2$ in FIG. 7. This has the effect of moving the operating point to a higher speed, and so the rotor accelerates.

Figure 8:
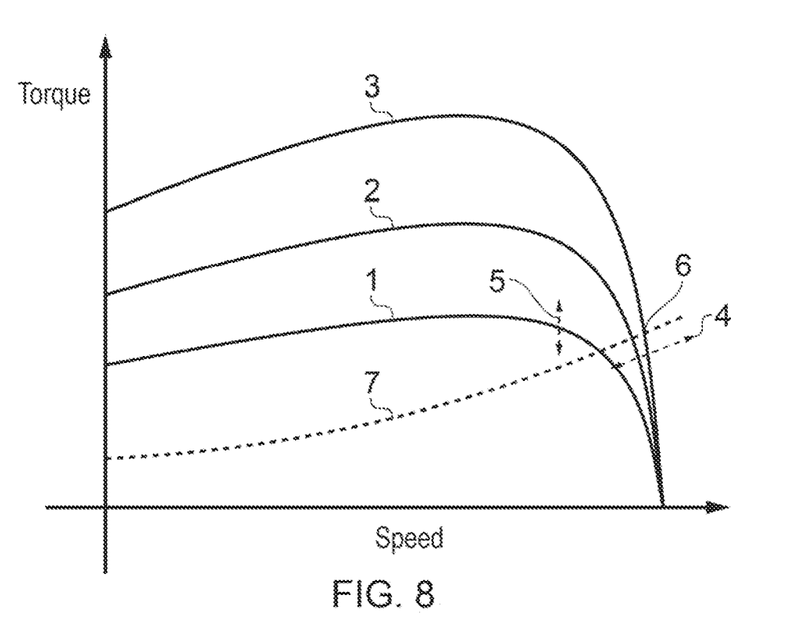
FIG. 8 is a graph showing the torque/speed curves for the electric motor of FIG. 4 when different voltages are applied to the stators.

FIG. 8 shows how adjusting the voltage applied by the controller 114 to the third set of stators 160 can be used to adjust the torque applied by the motor 112. Solid line 2 shows the torque applied to the rotor 150 by the first and third sets of stator windings 156, 160 (i.e. the stator windings driven directly by the engine AC bus 116) as a function of rotational speed of the rotor 150 for a given voltage. Solid line 1 shows the torque applied by the second stator windings 158. Broken line 7 shows the torque imposed on the rotor 150 by the mechanical load (i.e. the fuel pump 110) as a function of speed. The torque imposed on the rotor 150 by all of the stator windings 156, 158 160 results in the 'sum' curve 3, Arrow 5 shows how curve 1 will be altered by increasing or reducing the voltage through windings 158 (i.e. increasing the voltage will move the curve 1 upwards as shown in the graph, and reducing the voltage will move the curve downwards). By altering curve 1 by increasing or reducing the voltage, the operating point 6 of curve 3, is moved as shown by arrow 4, which in turn alters the motor speed, and therefore the fuel pump flow (assuming a fixed displacement pump).

Where it is desirable to increase or decrease the rotational speed of the rotor 150, and so increase or decrease the pumping speed of the fuel pump 110 (to accommodate required engine accelerations or decelerations respectively for example, as commanded by the FADEC 182), the torque imposed on the rotor 150 by the second set of stator windings 158 can be adjusted by adjusting the voltage of the electrical current applied to the second set of stator windings 158 by the voltage controller 114. In this situation, a signal is sent from the motor controller 174 to the voltage controller 114 to adjust the voltage of the electrical power produced by the controller 114.

For example, where the electrical voltage of the power applied by the stator windings 158 is reduced to lower than the voltage applied to the first and third sets of stator windings 156, 158, torque will reduce as the operating point moves down the load curve towards the origin, decelerating the motor. Essentially, by controlling the voltage of the electrical power to the stator 158 the operating point can be altered and the motor speed changed.

On the other hand, if the electrical voltage of the power applied by the stator windings 160 is higher than that applied to the first and third sets of windings 156, 160, the rotor 150 will be accelerated. Essentially, by applying electrical power to the stator 160 at a higher voltage the operating point is moved up the load line away from the origin, leading to operation at a higher speed.

Furthermore, in order to change the pumping speed by a large amount the voltage controller 114 would have to have a relatively large rating, and be supplied with (or supply) a relatively large amount of power. Such a requirement would necessarily result in a relatively large and heavy voltage controller 114 (though not as large as if all of the power transmitted to the motor 112 required transmitting through a frequency controller).

Furthermore, the power send to the stator segments should be as symmetrical as possible to reduce torque ripple and bearing wear. I.e. if power is sent to one stator segment, the same proportion of power should be sent to the opposite segment on the opposite side of the stator. The same is the case for the power from the voltage controller. The segments could also be magnetically, thermally and electrically isolated from each other to prevent interference and faults from travelling from one segment to the other, for example mutual magnetic coupling between segments.

Consequently, the motor 112 is also capable of changing speed by activating or deactivating one or more of the first and second sets of electrical stator windings 156, 158, by operating the switches 168, 170 to couple or decouple individual stator sets 156, 158 from the AC electrical bus 116. The switches 168, 170 are controlled by the motor controller 174, which controls the switches 168, 170 in accordance with a required motor speed.

Figure 6:
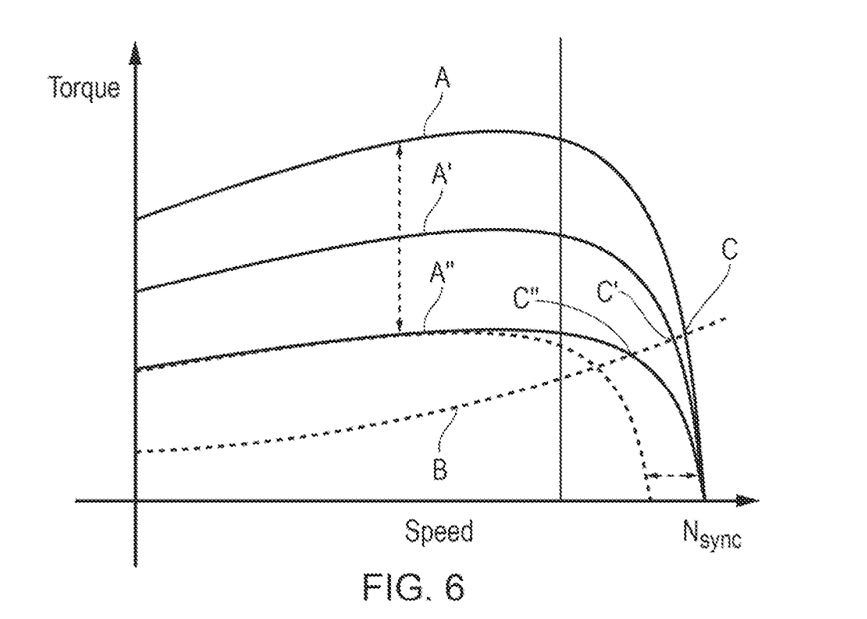
FIG. 6 is a graph showing the torque/speed curves for the electric motor of FIG. 4 when operated in different operating modes.

FIG. 6 demonstrates the effect of activating or deactivating the first and second sets of stator windings 156, 158. Line A represents the torque applied to by the rotor 150 by the first and second sets of stator windings 156, 158 when both the first and second stator windings 156, 158 are driven by the engine AC bus 116. Again, the line B represents the load imposed on the rotor 150 by the fuel pump 110 and third stator windings 160, and C represents the speed at which the torques of the first and second stators 156, 158 and load 110, 160 are matched, and so represents the operating point for the motor 112.

Line A' represents the torque applied to the rotor 150 by only the first set of stator windings 156, i.e. when the second stator winding 158 is not connected to the AC bus 116. For a given speed, less torque is produced when only the first stator winding 156 is used to drive the rotor 150, compared with when the first and second sets 156, 158 are used to drive the rotor 150. Consequently, the torque curves A' and B meets at a different, lower speed, and so the motor operates at a lower operating point, C'.

Line A" represents the situation where the first stator 156 is disconnected, and the second stator 158 is connected. The first stator set 156 has a higher rating than the second stator set 158, and so is capable of supporting a greater torque. Consequently, when only the second stator set 158 is connected, a still smaller torque is produced for a given speed compared to when only the first stator set 156 is connected, and consequently the motor 112 operates at a third, lower operating point C".

The ratings of the stators 156, 158 may be determined such that the torque curves A, A', A" correspond to fuel pump 110 speeds which in turn correspond to fuel flow requirements of specific operating points of the gas turbine engine 10. For example, the first set of stator windings may be rated such that when the motor 112 is operated with only the set of first stator windings operational, the fuel flow provided by the pump 110 corresponds approximately to that required for steady engine operation at cruise conditions.

The second set of stator windings 158 may be rated such that operation of the first and second stator windings 156, 158 corresponds approximately to a fuel requirement for operation of the engine 10 at takeoff power, and operation of only the second stator winding 158 corresponds approximately to a fuel requirement for a lower power setting. The segment power ratings and position around the rotor would be selected to minimise torque imbalance, through for example having opposing segments controlled by the same input. Also only certain combinations of segments could be allowed to reduce possible imbalances.

The above three methods of operation of the motor 112 (frequency control, voltage control and stator switching) can therefore be used in combination to provide fine control across the entire speed range of the engine 10. For example, operation of selected stator winding sets 156, 158, 160 can provide the specific torque necessary for operation of the fuel pump 110 at specific operating points of the engine, with adjustment of the voltage of electrical power by the voltage controller 114 through the third set of stator windings 160 providing control between these set points. Consequently, full speed control can be provided, while reducing the requirement for power rating of power electronics needed, thereby resulting in a lightweight, flexible fuel system. In addition the power electronics could be an AC to AC connection, that includes voltage control, such as a switched autotransformer. This could be a simple, robust, low cost method of achieving voltage control.

A further advantage of the above arrangement is that the multiple winding sets 156, 158, 160 provide inherent redundancy, since if one of the stators 156, 158 fails, this can be compensated for by the third set of stator windings 160. Alternatively, the arrangement could be simplified by having only first and second sets of stator windings, with the first set being supplied with power by the AC bus 116, and the second set being supplied with power by the voltage controller 114. In addition the voltage controller could connect to multiple segments to offer alternative control settings or provide redundancy.

Figure 5:
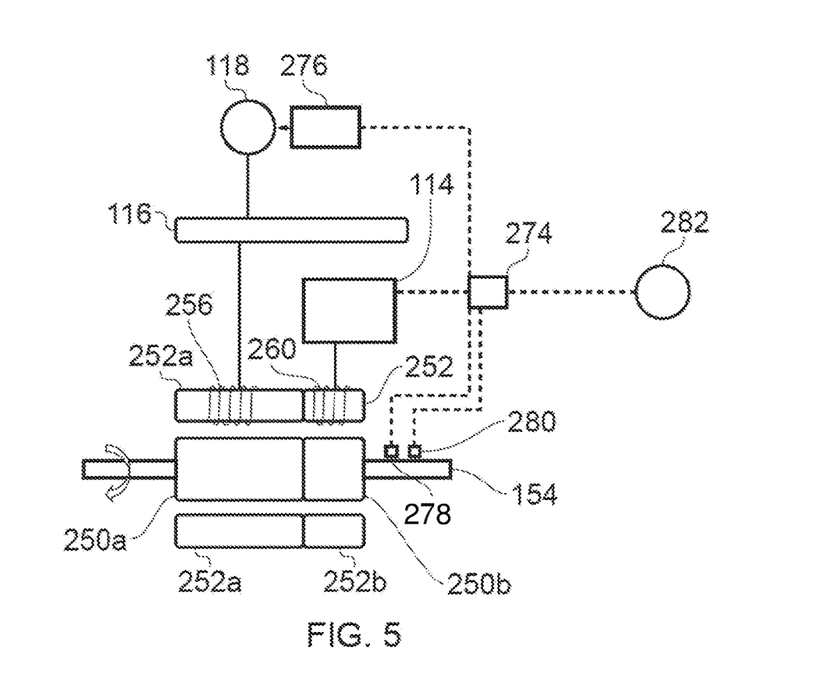
FIG. 5 is a schematic view of a second electric motor for use with the fuel system of either FIG. 2 or 3.

FIG. 5 shows an alternative electric motor 212, which can be used in placed of the motor 112.

The motor 212 comprises first and second rotors 250a, 250b which are arranged coaxially, and are each coupled to the same shaft 154 such that rotation of the rotors 250a, 250b causes rotation of the shaft 154, and ultimately, pump 110.

The motor 212 further comprises first and second stators 252a, 252b. The first stator 252a comprises a first set of three phase stator windings 256 driven by AC electrical current from the AC electrical bus 116, while the second stator 252b comprises a second set of stator windings 260 driven by AC electrical current from the frequency/voltage controller 114.

The motor 212 operates in a similar manner to the motor 112, with the second set of stator windings 260 powered by the frequency/voltage controller 114 providing control of the rotational speed of the rotor 250b by adjusting the frequency/voltage of the AC electrical power provided to the second set of stator windings 260. Since the rotors 250a, 250b are coupled to a common shaft 154, speed control of the rotor 250b results in a torque being applied to rotor 250a, and to the shaft 154.

In this embodiment, only a single set of stator windings powered by the AC bus 116 at the frequency of the generator 118 is provided. Consequently, the second set of stator windings 260 may have to have a relatively high rating in order to provide the necessary wide range of motors speeds to provide the required fuel flow during engine acceleration.

To solve the above problem, additional control may be provided by voltage control of the output from the generator, which may be particularly suitable where an independent generator 236 is used, which only provides power to the motor 212 which powers the fuel pump. Also the variable frequency nature of the network (360-800 Hz), which changes the position of the TS curves cross the X-Axis may give sufficient intrinsic power and demand matching that the voltage control required for fine fuel control is not significant—i.e. the network frequency varies with shaft 36, 38, 40 speed. Shaft speed is highest when engine power is high, which is when high fuel flow is required. If higher frequency power is applied to the stators, the operating point will move to a higher speed—higher torque point on the load curve, meaning the fuel flow is high and close to what is needed, meaning only a small amount of fine control is required via the voltage/frequency/switched controlled segment to achieve the required fuel flow (this is true of the radially segmented configuration FIG. 4 as well).

In such an arrangement, a voltage regulator 276 is provided, which controls the voltage provided by the generator 236, and so the voltage to the first set of stators. The voltage regulator 276 is controlled by a motor controller 274, which controls the electrical output voltage of the frequency/voltage controller 114. Through controlling the voltage of both the generator and voltage controller faster response of the motor should be achievable (note to give fine control the voltages need to be different). Speed and torque sensors 278, 280 are provided on the shaft 154 to sense the torque and speed of the pump 110. The voltage of the AC electrical power from the generator 236 and the frequency of the power from the frequency/voltage controller 114 are both controlled by the controller 274, such that the speed and torque sensed by the respective sensors 278, 280 correspond to the speed and torque demanded by the FADEC 282 in accordance with fuel demand for a required engine throttle setting.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, elements of various embodiments can be combined. The motors 112, 212 could be used with any of the electrical networks. A voltage controller could be used in conjunction with the motor 112, and could be omitted in the case of the motor 212. The switches 168, 170, 172 could be omitted. The motor 212 could comprise further sets of stator windings driven by the AC bus 116, with switches being provided and controlled by the controller 274 to provide improved rotor speed control with reduced power electronics. Any of the motors, controller and electrical networks could be used for either conventional combustors or staged combustors. In the case of a stage combustor, the electric motor 112, 212 could be used to drive both fuel pumps 110*a*, 110*b*, with a recirculation loop back to the input of the pump and a mechanical fuel metering unit used to impinge the flow and offer individual fuel flow control for one or both of the pumps. The motor 112, 212 could be used to power further engine accessories, such as engine oil pumps. Further redundant electrical motors or electrically isolated sets of stator windings could be provided to provide operation in the event of failure of a motor or set of stator windings. The or each set of stator windings could have more or fewer phases. Different proportions of the electrical power for the motor 112, 212 could be provided from the two sources.

The frequency/voltage controller could be coupled to an AC electrical power source, in which case the frequency/voltage controller could comprise an AC/AC frequency converter, configured to convert an AC power of one voltage to another. If only voltage reduction is required, a switched autotransformer could be used. Other voltage controllers include methods to control DC link voltage with chopper circuits or buck boost circuits. Inverters also typically can offer voltage control. Potential dividers could also be used.

The voltage/frequency controller could also be a fault tolerant unit, in its simplest form this could simply be redundancy, or having a double 3 phase winding with a dual output inverter (12 switching devices rather than the usual 6). Also multi-phase windings with individual phase control (e.g. H-bridges) could be used, where the coils in the voltage controlled segment are concentrated to avoid cascade failures.

The windings could include multiple sets powered by the same source (main generator or voltage/frequency controller). These windings could be series or parallel connected with (open) star or (open) delta and with neutral or floating neutral connections; the choice will depend in large part upon the degree of fault-tolerance required.

Other aspects of fuel control could be controlled by values, such as emergency shut off valves, direction of flow to fuel-draulic actuators and use of fuel for cooling.

Aspects of any of the embodiments of the invention could be combined with aspects of other embodiments, where appropriate.

The invention claimed is:

1. A fuel system for a gas turbine engine, the gas turbine engine comprising a combustor having a fuel injector, the gas turbine engine comprising a main alternating current electrical generator driven by an engine shaft such that an electrical output frequency of the electrical generator varies in dependence on engine rotational speed, the fuel system comprising:
 a variable flow fuel pump configured to provide a fuel flow to the fuel injector;
 a frequency and/or voltage controller configured to provide electrical power having at least one of a predetermined output frequency and a predetermined voltage; and
 a variable speed electric motor configured to drive the fuel pump;
 the electric motor comprising an induction motor having a stator and at least a first rotor, the stator having first and second sets of stator windings, each set of stator windings being configured to impart a torque on the first rotor to drive the fuel pump in use, the first set of stator windings being supplied only with electrical power from an AC bus powered by the main generator, the electrical power from the AC bus supplied to the first set of stator windings having a same electrical output frequency and voltage as the electrical output frequency and voltage output by the main generator, and the second set of stator windings being supplied only with electrical power output from the frequency and/or voltage controller.

2. The fuel system according to claim 1, wherein one or each set of stator windings is polyphase, and comprises three electrical phases.

3. The fuel system according to claim 1, wherein each of the sets of stator windings is arranged around a circumference of the stator.

4. The fuel system according to claim 3, wherein the first and second sets of stator windings are arranged alternately around the circumference of the stator, such that each stator winding of the first set is located between a stator winding of the second set.

5. The fuel system according to claim 1, wherein the fuel system comprises a stator controller configured to selectively activate one or more electrical stator windings of the sets of stator windings.

6. The fuel system according to claim 1, wherein the electric motor comprises a second rotor mechanically coupled to the first rotor, wherein the first rotor is associated with the first set of stator windings, and the second rotor is associated with the second set of stator windings.

7. The fuel system according to claim 6, wherein the first and second rotors are mounted to a common shaft and arranged co-axially.

8. The fuel system according to claim 1, wherein the main generator comprises a generator control unit configured to control the voltage of power generated by the main alternating current generator.

9. The fuel system according to claim 1, wherein the frequency and/or voltage controller is powered by the AC bus.

10. The fuel system according to claim 1, wherein a plurality of main alternating current electrical generators are provided.

11. The fuel system according to claim 10, wherein one of the plurality of main alternating current electrical generators is arranged to only provide electrical power to engine loads such as the electric motor configured to drive the fuel pump.

12. A gas turbine engine comprising the fuel system in accordance claim 1.

13. A method of controlling the fuel system in accordance with claim 1, the method comprising:
controlling the frequency and/or voltage of the electrical power in the second set of stator windings to adjust the rotational speed of the rotor to thereby operate the fuel pump to match a fuel demand of the engine.

* * * * *